United States Patent Office 3,636,202
Patented Jan. 18, 1972

3,636,202
TREATMENT OF RHEUMATOID ARTHRITIS AND RELATED DISEASES
Lewis A. Klein, Silver Spring, Md.
(2901 16th St. NW., Washington, D.C. 20009)
No Drawing. Filed Feb. 12, 1968, Ser. No. 704,565
Int. Cl. A61k 27/00
U.S. Cl. 424—183                                        10 Claims

ABSTRACT OF THE DISCLOSURE

There are provided compositions and methods for the treatment of rheumatoid arthritis and related diseases. A first composition contains Histamine, Serotonin and Heparin which is effectively administered with a second composition of oxytetracycline, lincomycin and nicotinic acid. The two compositions are periodically administered according to a regimen of increasing dosages of the first mentioned composition. Thereafter, the first mentioned composition is discontinued and the second mentioned composition is administered on a sustaining basis.

---

This invention relates to novel compositions useful in the treatment of rheumatoid arthritis and related diseases, and to methods for using such compositions in the treatment of rheumatoid arthritis.

For the purposes of this specification and claims, the term "rheumatoid arthritis" is to be understood to include the related diseases such as *Lupus erythematosis*, Scleroderma, Psoriasis, Dermatomyositis, Polymyositis, *Periarteritis nodosa*, chronic ulcerative colitis, regional ileitis, for reasons which will be hereinafter apparent.

It is an object of the present invention to provide novel antibiotic and cellular chemical compositions for use in the treatment of man suffering with rheumatoid arthritis.

It is another object of the invention to provide novel methods of treating man suffering with rheumatoid arthritis.

Still further objects of the invention will be apparent from the following disclosure and the appended claims.

Rheumatoid arthritis is a crippling disease characterized by the inflammation of the joints and organs of the body, and usually accompanied with swelling, pain and stiffness. The disease can involve the more vital organs of the body, especially in advanced cases, such as the heart, brain, kidneys, liver and also the circulatory system of these organs. The disease normally becomes chronic and progressively severe, resulting in disability and invalidness. While the disease is one of the oldest recorded maladies, little progress has been made toward an effective treatment, due to a lack of knowledge as to the cause or causes of the disease.

It has been proposed that pleuropneumonia-like organisms, hereinafter referred to as PPLO, might be the cause of rheumatoid arthritis and that a therapeutic approach might be effective in the treatment of this disease. See Brown, "The Puzzle of the Rheumatic Disease," 6 Md. State Med. J. No. 2, pp. 88 to 109 (1956). However, this theory has not gained wide acceptance.

It has also been proposed that rheumatoid arthritis may be caused by hypersensitivity to certain chemicals found in the body, but treatments to desensitize patients resulted in increased effects of the disease.

According to recent work by Dougherty and Berliner of the University of Utah, phagocytic cells engulf foreign substances, and in so doing overfunction, burst and liberate their contents. These contents include Histamin, Serotonin and Heparin which are toxic outside their cellular confines causing connective tissue distortion and peripheral vascular malfunction. It is believed that the occurrence plays a very important role in rheumatoid arthritis and related diseases.

It has now been found that rheumatoid arthritis can be effectively treated according to a new procedure using novel antibiotic and cellular chemical compositions containing the Histamine, Serotonin, and Heparin in a suitable form for administration. Examples of typical amounts and constituents of these novel cellular chemical compositions are given in Table I below.

TABLE I

| | Histamine phosphate, mg./cc. | Serotonin creatinine sulphate monohydrate, mg./cc. | Heparin sod. U.S.P., units/cc. |
|---|---|---|---|
| Composition: | | | |
| A | 0.00000275 | 0.000003 | 0.001 |
| B | 0.0000275 | 0.00003 | 0.01 |
| C | 0.000275 | 0.0003 | 0.1 |
| D | 0.00275 | 0.003 | 1.0 |

In Table I above, compositions A, B, C, and D are made of the ingredients as indicated. These compositions may be mixed with any suitable physiological carrier such as physiological saline and also with a preservative, such as 0.9% benzyl alcohol. Another example of a suitable physiological carrier is a 5% glucose solution in sterile water.

These compositions have been found to be effective in the treatment of rheumatoid arthritis when administered to a patient intravenously, intramuscularly and subcutaneously. The antibiotic medicaments which are advantageously used in conjunction with the cellular chemical compositions are oxytetracycline (Terramycin), lincomycin (Lincocin), preferably along with nicotinic acid as a vasodilator (and preferably in the form of monoethanolamine nicotinate, such as Nicamin). In a preferred embodiment, which has been developed and found extremely effective, a schedule of treatment is followed as indicated in Table II.

While the preferred routine is shown in Table II, many variations are of course possible and the intravenous drip procedure may be carried out in less than 2 hours, for example, 1 hour, or for longer times. The treatments may be administered daily or infrequently as two times per week, or less.

It should be understood from the examples given in Table II that the series of treatments involve the administration of gradually increasing dosages of Histamine, Serotonin and Heparin. In the preferred embodiment the relative proportions of the three active ingredients remain substantially constant in the injections, but the amount of Histamine increases from 0.000000275 mg. in the first treatment to 0.001925 mg. in the twentieth treatment. Of course, other amounts of Histamine may be used in the first injection or the last injection and the proper amount will depend in part on the particular patient being treated and the degree of advancement of the disease in the patient. Preferably the increase in dosage is by way of a geometric progression wherein the multiplier, or ratio between the contents of Histamine in successive injections, vary between 1.33 and 2.0, although other multipliers may be used. Also in the preferred embodiment, the last six TABLE II.—TWO-HOUR INTRAVENOUS DRIP SCHEDULE TREATMENTS ADMINISTERED TWO OR THREE TIMES WEEKLY 250 cc Sterile Solution (Physiological Sodium Chloride or 5% Glucose in Water) Containing Ingredients in the Following Table

| Treatment | Terramycin intravenous, mg. | Lincocin sterile solution, mg. | Nicamin injection, cc. | Compositions of Table I |
|---|---|---|---|---|
| 1 | 100 | 200 | 1 | 0.1 cc. of Composition A. |
| 2 | 175 | 350 | 1½ | 0.15 cc. of Composition A. |
| 3 | 250 | 500 | 2 | 0.2 cc. of Composition A. |
| 4 | 250 | 500 | 2 | 0.4 cc. of Composition A. |
| 5 | 250 | 500 | 2 | 0.7 cc. of Composition A. |
| 6 | 250 | 500 | 2 | 0.1 cc of Composition B. |
| 7 | 250 | 500 | 2 | 0.15 cc. of Composition B. |
| 8 | 250 | 500 | 2 | 0.2 cc. of Composition B. |
| 9 | 250 | 500 | 2 | 0.4 cc. of Composition B. |
| 10 | 250 | 500 | 2 | 0.7 cc. of Composition B. |
| 11 | 250 | 500 | 2 | 0.1 cc. of Composition B. |
| 12 | 250 | 500 | 2 | 0.15 cc. of Composition B. |
| 13 | 250 | 500 | 2 | 0.2 cc. of Composition B. |
| 14 | 250 | 500 | 2 | 0.4 cc. of Composition B. |
| 15 | 250 | 500 | 2 | 0.7 cc. of Composition B. |
| 16 | 250 | 500 | 2 | 0.1 cc. of Composition B. |
| 17 | 250 | 500 | 2 | 0.15 cc. of Composition D. |
| 18 | 250 | 500 | 2 | 0.2 cc. of Composition D. |
| 19 | 250 | 500 | 2 | 0.4 cc of. Composition D. |
| 20 | 250 | 500 | 2 | 0.7 cc. of Composition D. |
| 21 | 250 | 500 | 2 | 0.6 cc. of Composition D. |
| 22 | 250 | 500 | 2 | 0.6 cc. of Composition D. |
| 23 | 250 | 500 | 2 | 0.6 cc. of Composition D. |
| 24 | 250 | 500 | 2 | 0.6 cc. of Composition D. |
| 15 | 250 | 500 | 2 | 0.6 cc. of Composition D. |
| 26 | 250 | 500 | 2 | 0.6 cc. of Composition D. | injections contain an amount of Histamine about 85% that of the twentieth.

Oral medication such as an analgesic may be given simultaneously with the treatment. If the patient had been on active treatment with steroids, the frequency and amount of doses of the steroids can be gradually decreased during the treatment described herein. When withdrawal of steroids caused much discomfort, 40 mg. of adrenocorticotrophic hormone gel (ACTH) may be administered intramuscularly to obtain 12 to 36 hours improvement.

Following the treatment such as the one indicated in Table II, an oral antibiotic medication is advantageously given. This oral medication may be continued for many years. The oral antibiotic medication comprises a combination of Terramycin, Lincocin, and preferably nicotinic acid as a vasodilator. Also advantageously oxyphenbutazone (Tandearil) and chlorpheniramine (Teldrin) are included. Suitable amounts of each constituent is given below:

TABLE III 3 times/day—3 times/week:
    10—250 mg. Terramycin (oxytetracycline)
    20—500 mg. Lincocin (lincomycin)
    50—100 mg. Tandearil (oxyphenbutazone)
    4—12 mg. Teldrin (chlorpheniramine maleate)
    50—500 mg. Nicotinic acid A particularly suitable combination is 125 mg. of Terramycin, 250 mg. of Lincocin, 100 mg. of Tandearil, 8 mg. of Teldrin and 100 mg. of nicotinic acid. Of course, other proportions may be used, the Terramycin and Lincocin being always necessary.

The effectiveness and the utility of the present invention are demonstrated by the following case histories which represent actual treatments of patients as indicated:

Method and materials

Although as shown from the case histories given below, the procedure for treatment can be varied for individual patients as to frequency of administering the medical treatment and the total duration of the treatment, the preferred procedure is as follows:

Twenty-six two-hour intravenous drip procedures are administered in the manner indicated by Table II. An intravenous drip procedure may be given two or three times weekly. Each treatment consisted of intravenous administration of physiological sterile saline or 5% glucose in sterile water containing Terramycin, Lincocin and Nicotinic acid (in the form of monoethanolamine nicotinate), plus gradually increasing doses of Histamine, Heparin and Serotonin (also known as 5-hydroxytryptamine. The Serotonin is preferably in the form of Serotonin mixed with creatinine sulphate monohydrate for stability. Oral medication may be used along with the intravenous procedure.

Following the intravenous series, oral antibiotic medication as shown in Table III is given from 1 to 4 times weekly. This oral routine may be continued for years.

Case 1: This case shows the results of an initial program consisting of prescribed oral medication and then an oral medication routine plus intravenous treatment. A tall lean 66-year old male in chronic and acute distress could not walk unaided and was suffering with painful and crippling arthritis. The disease had been in progress for about six years with increasing pain and swelling of joints. The disease had gradually spread and was throughout his body. For the last three years most of his time was spent in bed and had now become completely dependent—unable even to turn over by himself. He required strong analgesics. The past medical history was non-contributory except for being confined to bed for one week with scarlet fever at the age of 8. Recently he had been under the care of a cardiologist for "failing heart." Off and on during the last eighteen months he had taken steroids but none for the last week.

Laboratory test results: Urinalysis negative, WBC-normal. Hemoglobin 12.8 gm. percent, hematocrit 41%. Blood sed. rate (Wintrobe) 36 mm./hr. Latex test 4+. Serum uric ac. 2 mg. percent. Serum albumin 5.3 gm. percent. Serum globulin 3.0 gm. percent. VDRL neg. X-ray: Hands showed narrowing of all interphalangeal joints plus ulnar deviation of the fingers. Feet showed marked flat foot deformity. On the right the fourth and fifth digits were dislocated dorsally.

Treatment: Oral medication was prescribed as follows: Terramycin 125 mg., Teldrin 8 mg. and Aralen 250 mg. This medication was given three times per week for three months. The clinical improvement was only slight. Thereafter, the patient was treated with a two-hour intravenous drip treatment using 250 cc. 5% glucose in water containing 125 mg. of Terramycin, Histamine phosphate and Serotonin creatinine sulphate monohydrate, the latter two in the proportions to Terramycin as shown in Table II. Twenty-six such treatments were administered with increasing dosages as shown in Table II over a period of about eight months. During this period of intravenous treatments, the above oral medications were continued. Within two months of the last intravenous treatment, the patient was driving his car and was able to take long trips. The patient became entirely self-sufficient and only stiffness remained.

Case 2: A 65-year old housewife and mother of one child had a history of swelling of the hands and feet upon awakening in the morning. The patient was unable to get her shoes on until well after breakfast time. The disease had started seventeen years ago and had gradually spread to her arms and jaws. She could not eat after awakening until late morning. The patient had "histamine headaches" and had been treated with some improvement. For many years chocolate, sausage and pancakes produced "sick headaches" a few hours after ingestion. For the last two years, the patient had angina pectoris and could not walk up a hill, against the wind, make a bed, or get excited without suffering precordial pain, palpitation and dyspnea. Since the beginning of these latter complaints, the patient had been taking a combination tranquilizer-nitrate medication which provided some improvement. For the last five months, the patient had a painful swollen right knee and a stiffness and aching in all her joints when getting out of a chair after sitting a long time. Lately her left wrist and fingers hurt when attempting to wring out "things." The patient had numbness and blanching of her fingers for the past ten years when cold, while driving a car in the cold, or while carrying objects.

Laboratory test results: Urinalysis negative, WBC 5,200, Segmented polys 52, non-segs. 10, L 47, M 1. RBC 4,800,000, Hgb. 12 gm. percent. Blood sed. rate (Wintrobe) 2 mm./hr. Serum albumin 4.5 gm. percent. Globulin 2 gm. percent. Latex test negative. X-ray: hands showed only extremely early minimal degenerative changes involving the distal interphalangeal joints of all fingers and the right knee showed no abnormalities.

Treatment: Oral medication was given as follows: Terramyin 125 mg., and Teldrin 8 mg. This medication was given three times per week. On days when the patient was not receiving medication, an intravenous treatment was given. Twenty-six, semi-weekly, two-hour intravenous treatments were administered over a period of about four months. The intravenous regimen was the same as that of Case 1, except for the use of 250 cc. of isotonic sodium chloride solution and the increase of Terramycin intravenous to 150 mg. During the course of the treatment, the patient volunteered that all her symptoms had been much improved and her angina of effort was much less. Three and one-half years after the intravenous treatment, the patient remained in good health. The patient reported that she inadvertently ran for a bus one day and later suffered no dypsnear nor precordial pain. The patient has not taken any cardiac medication since the intravenous treatments were performed. For the last two years, the patient has eaten chocolate and pancakes without having the previously experienced headaches. The finger blanching and numbness are much less frequent and not as severe as before the treatment. The patient takes sustaining medication three times a week, as shown in Table III.

Case 3: A 48-year old female suffered with frequent bloody diarrhea, a painful left elbow which often caused her to drop things, and an allergy to certain foods for two years. In between periods of diarrhea of 10–12 B.M.s/day the patient would have small pellet-like stools and frequent urges for bowel movement without success. An examination was normal, except for proctoscopic findings in the lower sigmoid and rectum, where pin-head size bloody ulcerations were scattered throughout. The mucous membrane was moderately hyperemic. The lower one inch of the rectal vault showed slightly thickened and roughened appearance with occasional horizontal linear bleeding ulceration ¼″ to ¾″ long.

Laboratory test results: WBC 14,100, red blood cells, hemoglobin and urinalysis were normal. Blood sed. rate 4 mm./hr. VDRL neg. X-ray: Lungs clear. The heart was within normal limits and a Barium enema showed normal.

Treatment: Two-hour intravenous treatments as given in Case 2 where performed semi-weekly until a total of twenty-six treatments were performed. During this period, the patient improved considerably and lost all attacks of bloody diarrhea and was able to eat formerly offending foods. At the end of the treatment, a series of proctoscopic examinations showed only one rectal bleeding point. The bowel wall still seemed slightly hyperemic. During the following twenty-six weeks, the patient was given one intravenous treatment every two weeks. Following proctoscopic examinations showed a normal appearing lower bowel and no recurrence of bloody stools was experienced. Post-intravenous oral medication as in Table III was given. The patient has no more attacks of bloody diarrhea nor any tenderness in her left elbow and enjoys all foods. Also, the patient has gained twenty pounds.

Laboratory test follow-up: Approximately two years after the intravenous treatment, the following laboratory tests were taken: Latex test positive, Serum uric acid 4.85 mg. percent. WBC 4,883, segs 60, bands 1, L 35, M 4, Hgb. 12.3 gm. percent, hematocrit 39.5 percent, blood sed. rate 15 mm./hr. (Wintrobe). Serum protein electrophoresis: albumin 2.74 gms. percent, $alpha_1$ globulin 0.11 gm. percent, $alpha_2$ globulin 0.59 gm. percent, $beta_1$ globulin 1.08, gamma globulin 1.68. A/G ratio 0.79.

Case 4: A 48-year old female telephone operator had suffered bursitis of the right shoulder for four years. X-rays in the past had shown some calcium deposit in the sub-deltoid bursa. The patient had been treated with injections (intrabursal) of hydrocortisone about every four to six weeks with some relief each time.

Laboratory test results: Complete blood count was normal. Blood sed. rate 21 mm./hr. (Wintrobe). Serum uric ac, 3.3 mg. percent, latex test neg., serum albumin 2.91 gms. percent, $alpha_1$ globulin 0.40 gm. percent $alpha_2$ globulin 0.94 gm. percent, $beta_1$ globulin 0.76 gm. percent, $beta_2$ globulin 0.81 gm. percent, gamma globulin 1.78 gm. percent, A/G ratio 0.62. X-ray: No calcium deposits were detected. Hands and wrists show no abnormalities. In spite of the fact that there was a negative latex test and a lack of apparent joint involvement, it was considered that because of the bursitis of two years duration and the very definite present of dysproteinemia, the patient was suffering from arthritis and the course of intravenous antibiotic-antihypersensitivity treatments similar to that of Case 3 was given. The intravenous treatments and oral medication of Case 3 were given and after the intravenous treatment no bursitis pain was experienced. The patient has received sustaining medication according to Table III.

Case 5: A 59-year old female spinster had suffered various joint pains, particularly in damp weather, for the past 30 years and her knees had become quite painful and moderately swollen. For many years upon awakening in the morning her hands would be numb, swollen and sore. She was unable to get on and off a bus without help and had to scoop up her newspaper at her door with both hands. The patient suffered with continual nervousness. Thirteen years before, the patient had been hospitalized for acute iritis of the right eye. This disease responded to "cortisone" drops. The patient had suffered with occasional migraine headaches from age 30 to age 50. All of the drugs tried for this acute condition produced nausea and vomiting.

Laboratory test results: The complete blood count was normal. Blood sed. rate 22 mm./hr. (Wintrobe). Serum uric ac. 4,25 mg. percent. Latex test neg. Serum protein electrophoresis normal except for $beta_1$ globulin which was 0.91 gm. percent. X-ray: Both hands and wrists show generalized bone demineralization. There is narrowing of the distal interphalangeal joints with osteophytes on the opposing articular surfaces.

Treatment: The same procedure of Case 4 was administered. The twenty-six intravenous treatments were administered over a period of about four months, after which procedure the patient was placed on the oral medication of Table III. The patient's arthristis improved immediately after the intravenous treatment.

Case 6: A 49-year old businessman complained of nervousness, tension and post-prandial epigastric pains for the last four years and experienced relief only on vacations. For fifteen years, the patient had suffered occasional attacks of vertigo which was sometimes slight and at other times necessitated bed rest and avoidance of sudden change of position of he wishes to prevent nausea and vomiting. There was no loss of hearing. Hospitalization and spinal taps brought no specific relief. Occasionally the patient would also suffer severe sharp shooting pains in his head and occasional swelling of the heels, toes, knees or fingers for a day or two. There was no morning stiffness. The patient had pleurisy twice about 17 years ago and was hospitalized for this condition once. The patient had also suffered severe foot pains off and on for over 20 years, particularly at bedtime. His father was living and suffered form painful arthritis. Out of six brothers one suffered with mild diabetes, one died of colitis, and one died of heart trouble.

Laboratory test results: VDRL non-reactive, WBC 4,800, RBC 4,600,000 Hgb. 14.6 gm. percent, blood sed.

rate 20 mm./hr. (Wintrobe), latex test positive, serum albumin 4.7 gm. percent, serum globulin 3.1 mg. percent.

Treatment: The combination of intravenous treatments and oral medications as in Case 1 was administered. After nineteen such treatments, the patient felt better and stopped the intravenous treatment, but he did continue with the oral medication of Table III. About 5 years later, the patient returned with the complaints of troublesome vertigo for four weeks and of joint pains for the last few months. Because of finger swelling he had his ring sawed off. The patient had had an "infected" tooth removed the prior week. A complete series of twenty-six intravenous treatments were administered over a period of about two and one-half months according to the routine of Table II, except that the Terramycin-intravenous was given in doses of only 150 mg. and the Lincocin-injection was given in doses of only 75 mg. He was then placed on oral medications as listed in Table III.

Results: The patient lost all of this complaints, gained weight, and appeared in good general health.

Although not bound by theory, it appears that rheumatoid arthritis and its related diseases may be a product of hypersensitivity to one's own cellular chemicals and an infection caused by a little understood microbe identified as PPLO (Pleuropenumonia-like organism). While PPLO has been extracted and isolated from rheumatoid arthritis joint fluid, the injection of such extract into joints of volunteers never produced a transmission of the disease. Therefore, the connection between PPLO and rheumatoid arthritis has been generally discredited.

The present inventor observed that there appeared to be some similarity between Parkinson's disease and rheumatoid arthritis, and concluded that these two seemingly dissimilar diseases may be but different manifestation of one chief disorder. It was further concluded that perhaps a number of diseases commonly coexisting with rheumatoid arthritis were other manifestations of the same single disorder. Proceeding along this theory, the above-described compositions and methods of treatment were devised whereby a treatment to desensitize the patient to certain cellular chemicals is carried out in conjunction with a specific antibiotic treatment to destroy PPLO organisms. The unexpected and superior results of these compositions and methods are shown in the above case histories and support the correctness of the inventor's theories. While the present treatment uses and antibiotic-antihypersensitivity regimen to successfully treat rheumatoid arthritis patients, it should also be noted that conditions or maladies which coexisted with rheumatoid arthritis and referred to as related diseases improved along with the arthritic condition during and after the treatments disclosed herein.

Referring to the examples of case histories above, Case 1 shows that oral antibiotic medication alone is ineffective and the antibiotic-antisensitivity procedure described in Table II brought about a spectacular and unexpected response from the patient. The patient in Case 2 was apparently suffering from a moderately active rheumatoid arthritis complicated by angina pectoris. The patient in Cases 2 and 3 exhibited food allergies. All of these coexisting conditions or related diseases improved with the treatment for the rheumatoid arthritis. The patients in Case 6 had vertigo which was apparently the result of cerebellar rheumatoid disease, which improved simultaneously under the present novel treatment.

Many other actual case histories can be given to show similarly phenomenal success of the present novel compositions and treatments. It is important to note the comments of the patients themselves and objective signs of improved general well being, such as gain of weight.

The invention has been described in detail with particular reference to the preferred embodiments thereof, but it will be understood that variations and modifications can be effectuated within the spirit and scope of the invention as described hereinafter and as defined in the appended claims. Unless otherwise stated, all percentages herein are by weight.

What is claimed is:

1. A method for the treatment of rheumatoid arthritis comprising administering to a patient suffering from rheumatoid arthritis a rheumatoid arthritis treating effective amount of cellular chemical composition, composition comprising histamine, serotonin and heparin and subsequently administering a rheumatoid arthritis treating effective amount of antibiotic composition comprising oxytetracycline and lincomycin, the proportions of the cellular chemical composition ingredients being histamine 0.00000275:0.00275 mg./cc. to serotonin 0.000003:0.003 mg./cc. to heparin 0.001:1.0 U.S.P. units/cc., and the proportions of oxytetracycline/linocomycin being from 10 to 250 mg./20 to 500 mg. respectively.

2. A method according to claim 1 wherein the antibiotic composition also contains nicotinic acid in a proportion of 50 to 500 mg.

3. A method according to claim 1 wherein the antibiotic composition is also administered in conjunction with the cellular chemical composition.

4. A method according to claim 1 wherein said proportions of histamine/serotonin/heparin are 2.75 mg.: 3 mg.: 1,000 U.S.P. units.

5. A method according to claim 1 wherein said serotonin is present in the form serotonin creatinin sulphate monohydrate.

6. A method according to claim 1 further comprising benzyl alcohol as a preservative.

7. A method according to claim 1 also comprising a physiologic fluid carrier.

8. A method according to claim 7 wherein said physiologic fluid carrier is 5% glucose in sterile water or physiologic saline.

9. A method according to claim 1 wherein the administration is by intravenous injections.

10. A method according to claim 9 wherein the injections are administered by an intravenous drip procedure.

References Cited

UNITED STATES PATENTS

| | | | |
|---|---|---|---|
| 3,004,893 | 10/1961 | Martin | 424—35 |
| 3,030,272 | 4/1962 | Schultz | 424—183 |
| 3,118,817 | 1/1964 | Nomine et al. | 424—183 |
| 3,208,908 | 9/1965 | Maxwell et al. | 424—94 |

OTHER REFERENCES

Conn, Current Therapy, W. B. Saunders Co., Philadelphia, 1966, pp. 649–654.

Fishbein, Handbook of Therapy, American Medical Association, Chicago, 11th edition, 1937, p. 242.

STANLEY J. FRIEDMAN, Primary Examiner

D. M. STEPHENS, Assistant Examiner

U.S. Cl. X.R.

424—227, 266, 273, 274